US007616756B2

(12) United States Patent
Blackwood et al.

(10) Patent No.: US 7,616,756 B2
(45) Date of Patent: Nov. 10, 2009

(54) CALL CENTER FIRST ACCESS RESOLUTION

(75) Inventors: Geraldine Blackwood, Mableton, GA (US); Elizabeth Pyatt, Richmond Hill (CA); Richard J. Vazzana, Ridgefield, CT (US); Gail D. Warren, Bloomfield Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 10/739,563

(22) Filed: Dec. 18, 2003

(65) Prior Publication Data

US 2005/0135597 A1    Jun. 23, 2005

(51) Int. Cl.
*H04M 3/00*    (2006.01)
(52) U.S. Cl. .............................. 379/265.13; 379/265.01; 379/266.02
(58) Field of Classification Search ............ 379/265.01, 379/265.13, 266.02
See application file for complete search history.

(56) References Cited

U.S. PATENT DOCUMENTS

| | | | | |
|---|---|---|---|---|
| 5,519,772 A * | 5/1996 | Akman et al. | .......... | 379/221.08 |
| 5,946,375 A | 8/1999 | Pattison et al. | ................ | 379/34 |
| 6,263,409 B1 | 7/2001 | Haupt et al. | ................ | 711/154 |
| 6,321,383 B1 | 11/2001 | Funahashi et al. | ............. | 725/92 |
| 6,356,907 B1 | 3/2002 | Hopmann | ..................... | 707/10 |
| 6,389,132 B1 * | 5/2002 | Price | ..................... | 379/265.01 |
| 6,466,663 B1 | 10/2002 | Ravenscroft et al. | ........ | 379/265 |
| 6,836,540 B2 * | 12/2004 | Falcone et al. | ......... | 379/127.02 |
| 2002/0042811 A1 | 4/2002 | Hirosawa et al. | ............ | 709/203 |
| 2002/0194047 A1 | 12/2002 | Edinger et al. | ................. | 705/9 |
| 2003/0005121 A1 | 1/2003 | Washio et al. | ............... | 709/225 |
| 2003/0093287 A1 | 5/2003 | Lowery | ........................ | 705/1 |
| 2003/0123640 A1 | 7/2003 | Roelle et al. | ........... | 379/256.06 |

* cited by examiner

*Primary Examiner*—Rasha S Al Aubaidi
(74) *Attorney, Agent, or Firm*—John Pivnichny

(57) ABSTRACT

A call center is operated to increase customer satisfaction and reduce costs by resolving requests during a first access. Common most frequently asked questions are identified and categorized into request and sub-request types. A request is received from a caller and handled by a call center agent via a referral. The referral may be to a web site URL. The request is logged into a tracking tool according to a first access resolution criteria. Periodically the data entered into the log is analyzed to determine first access resolution results by request and sub-request type. For those types having low first access resolution scores, the content of the corresponding web site URL is enhanced.

22 Claims, 2 Drawing Sheets

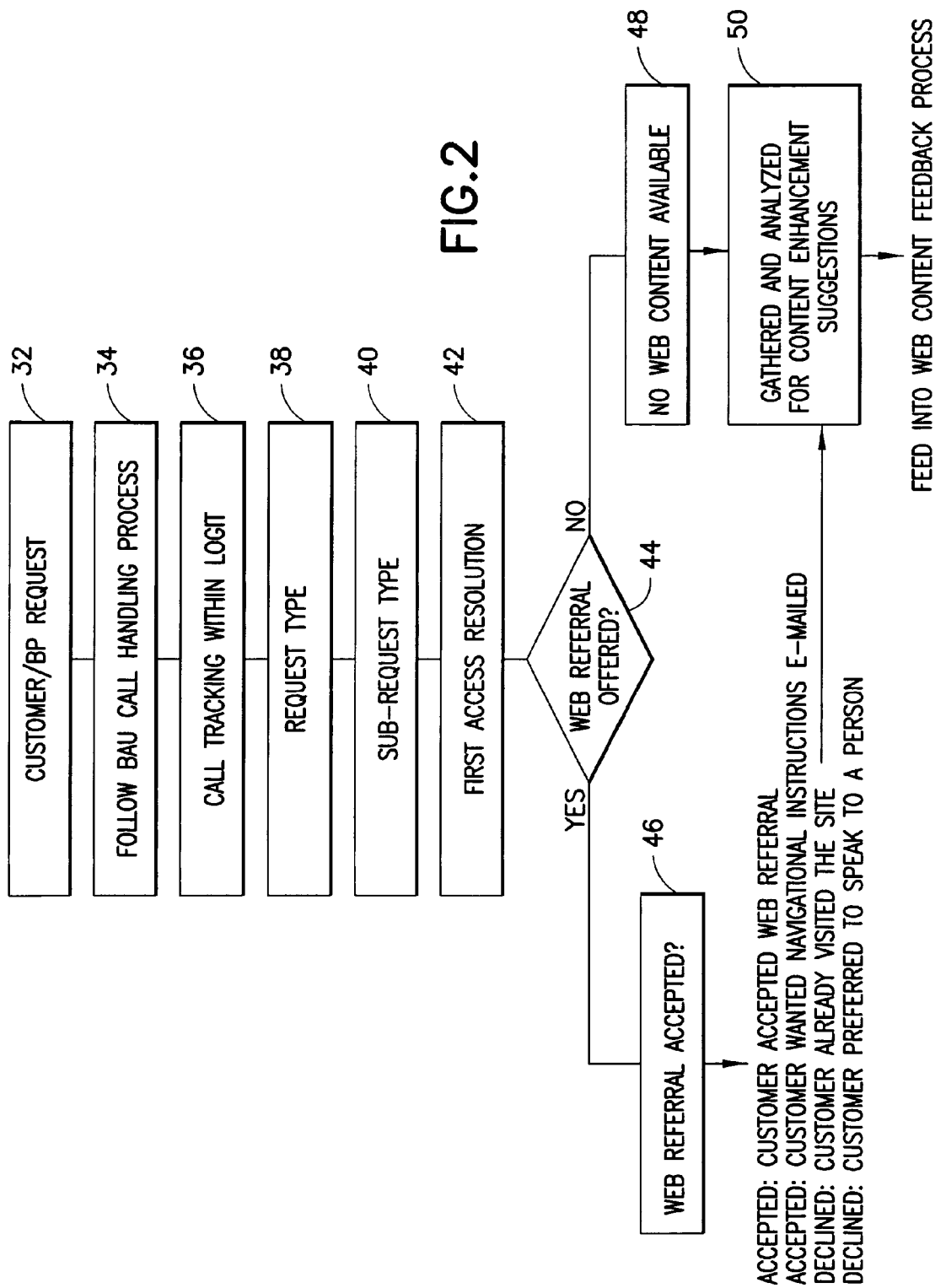

CALL CENTER FIRST ACCESS RESOLUTION

TECHNICAL FIELD

The invention relates generally to methods and systems for operating a call center. More particularly, the invention relates to operating a call center to resolve the purpose of the call during the first access from the caller. Even more particularly, the invention relates to continually improving a system of making referrals.

BACKGROUND OF THE INVENTION

Call centers are widely used to provide services to customers and other callers. Due to improvements in the telephone, telecommunications, and networking arts, a call center can typically be located anywhere in the world and operate around the clock. The term call center shall be taken herein to include centers which receive contact via telephone as well as via newer technologies including, but not limited to e-mail, live assistance, text chat, or any other contact methods known in the art and combinations thereof. Call centers using such newer technologies are sometimes also referred to as contact centers. Some examples of call center services include help desk support for workstation and software users, product information, customer service before and after a sale, and billing inquiries. Many other examples are in use today and more can be expected in the future. The example may relate to a product or service offered by the call center provider or by another company.

Operating a call center represents a significant cost to the providing company, and is therefore the subject of intense cost reduction activities by the providing company in order to have a business advantage over competing companies. For example, the call center may be located in a remote geographical area in order to reduce labor, benefits, and overhead costs.

Improving the productivity of call centers is also receiving great attention by the companies which operate them. For example, Pattison et al. in U.S. Pat. No. 5,946,375 describes monitoring the performance of service agents in handling customer calls by call center supervisors. Ravenscroft et al. in U.S. Pat. No. 6,466,663 describes further developments in monitoring the phone activity of the agents. U.S. Patent Application U.S. 2003/0123640 A1 by Roelle et al. describes systems for collecting, analyzing and representing data generated by a call center. Various measures are determined and compliance to the measures is indicated allowing effective evaluation of call center performance.

Despite the aforementioned and other cost reduction activities and performance improvement efforts, there remains considerable incentive for further improvements due to the high dollar value of expenditures by companies for operation of call centers. In addition, customer satisfaction with the handling of their calls needs to be improved, while reducing the cost of call center operation. One source of low satisfaction levels is due to multiple handoffs or transfers in resolving the customer request, many times resulting in a callback because the request was not fully answered in the first series of transfers.

Applicants have determined that there is a direct correlation between improved customer satisfaction and a reduction in handoffs. For example, a company may experience a 10-20% decline in customer satisfaction due to a first telephone transfer of a customer making a request. A second transfer increases this to a 20-30% decline.

Furthermore call center agents will typically spend less total time in handling a request that is resolved on a first access, when the time required to handle handoffs and callbacks is included.

It is believed that a system which reduces handoff while also reducing call center costs would constitute a significant advancement in the art.

OBJECTS AND SUMMARY OF THE INVENTION

It is therefore a principal object of the present invention to enhance the call center operation arts by providing a method of resolving customer requests during a first access. Use of such a method provides improved customer satisfaction levels while also reducing costs of agent labor through reduction of time required to resolve a request and prevention of callbacks resulting in decreased call volumes and the labor time associated therewith.

It is another object to provide a system for operating a call center wherein such enhanced capabilities is possible.

It is yet another object to provide a computer program product having such enhanced capabilities for operating a call center.

It is a further object of the present invention to provide a method of delivering such an enhanced call center operation capability to a client.

These and other objects are attained in accordance with one embodiment of the present invention wherein there is provided a method of operating a call center, comprising the steps of categorizing common inquiries into request and sub-request types, receiving a request from a caller and handling the request via a referral, logging the request into a log according to first access resolution criteria, and the request and sub-request types, periodically analyzing the log to determine first access resolution results by sub-request type, and enhancing content of the referral for those of the sub-request types having low scores for the first access resolution results.

In accordance with another embodiment of the present invention there is provided a computer system for operating a call center, the system comprising means for categorizing common inquiries into request and sub-request types, means for identifying a referral for a request received at the call center, means for logging the request into a log according to first access resolution criteria, and the request and sub-request types, means for periodically analyzing the log to determine first access resolution results by sub-request type, and means for enhancing content of the referral for those of the sub-request types having low scores for the first access resolution results.

In accordance with yet another embodiment of the present invention there is provided a computer program product for instructing a processor to operate a call center, the computer program comprising a computer readable medium, first program instruction means for categorizing common inquiries into request and sub-request types; second program instruction means for receiving a request from a caller and handling the request via a referral, third program instruction means for logging the request into a log according to first access resolution criteria, and the request and sub-request types, fourth program instruction means for periodically analyzing the log to determine first access resolution results by sub-request type, and fifth program instruction means for enhancing content of the referral for those of the sub-request types having low scores for the first access resolution results, and wherein all the program instruction means are recorded on the medium.

Further in accordance with another embodiment of the present invention there is provided a method of providing call center operation capability to a client, comprising the steps of delivering to the client a means for categorizing common inquiries into request and sub-request types, delivering to the client a means for receiving a request from a caller and handling the request via a referral, delivering to the client a means for logging the request into a log according to first access resolution criteria, and the request and sub-request types, delivering to the client a means for periodically analyzing the log to determine first access resolution results by sub-request type, and delivering to the client a means for enhancing content of the referral for those of the sub-request types having low scores for the first access resolution results.

BRIEF DESCRIPTION OF THE DRAWINGS

FIG. 2 shows additional detailed steps in the referral process of the present invention.

BEST MODE FOR CARRYING OUT THE INVENTION

Figure 1:
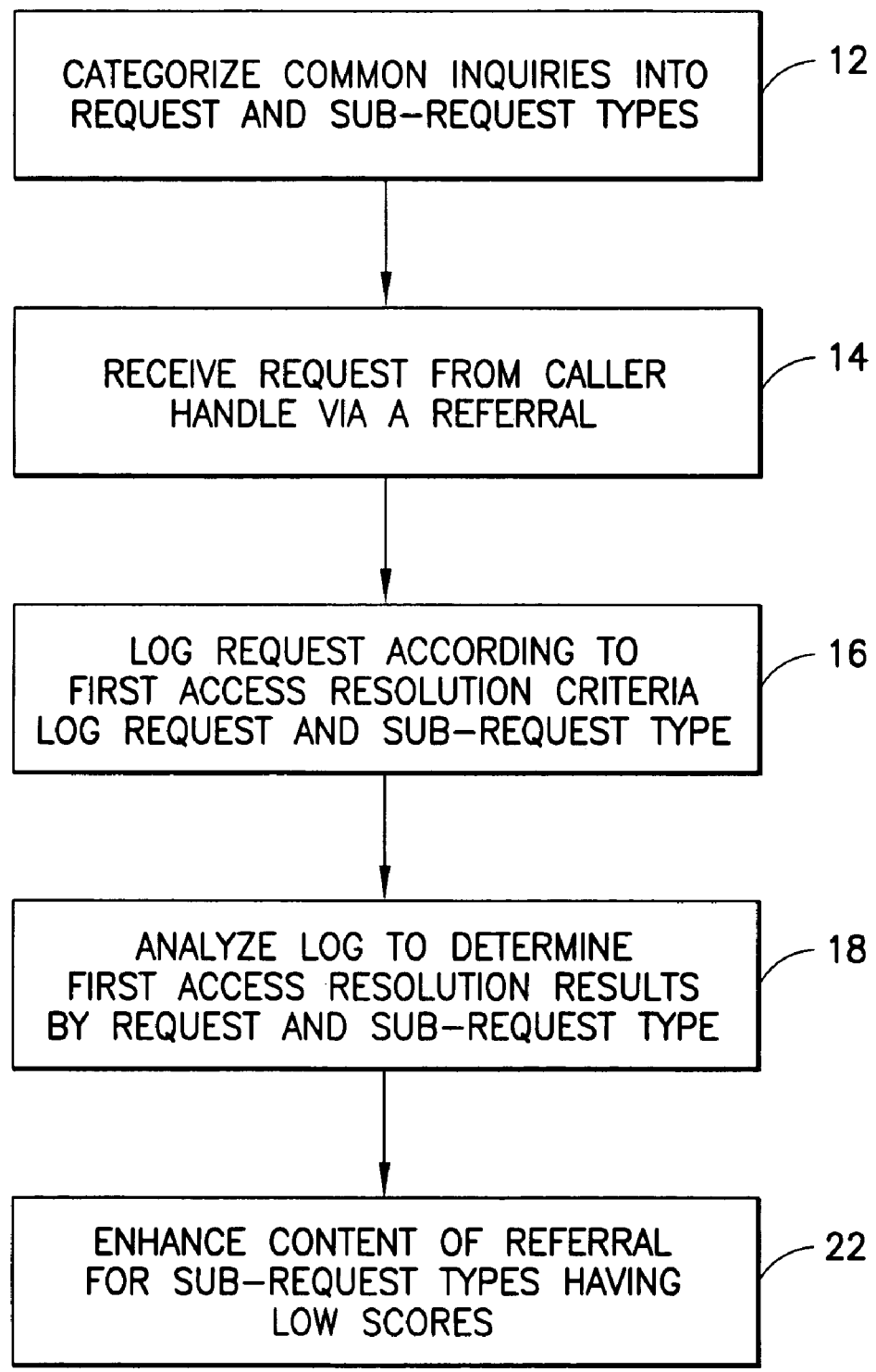
FIG. 1 illustrates a flowchart of one embodiment in accordance with the present invention.

For a better understanding of the present invention together with other and further objects, advantages, and capabilities thereof, reference is made to the following disclosure and the appended claims in connection with the above-described drawings.

In FIG. 1 there is shown a flowchart of steps performed in operating a call center in accordance with the present invention. In step 12 common inquiries received by the call center are categorized into request and sub-request types. For example, a company having a plurality of business units may ask each business unit to identify the most frequently asked questions received from customers and business partners. Such requests may have been received at a call center already in operation prior to implementation of the present invention. The questions may also have been received through other channels such as individual inquiries to a business unit employee whether by telephone, e-mail, person to person verbal request, instant message inquiry or any other route.

The inquiries are categorized into request types. For ease of categorization, some or all of the request types may have sub-request types. For example, a request type of "technical requests" may have sub-request types "hardware requests" and "warranty requests". The particular request type and sub-request type of categorization used may be described in the form of a table such as Table 1 below.

TABLE 1

| Request Type | Sub Request Type |
|---|---|
| Sales | General Product Information |
|  | Catalog Request |
|  | Place an Order |
| Technical | Submit a Service Request |
|  | Download a Driver |
|  | Warranty Look Up |
| General Information | Request an annual report |
|  | Employment Information |
|  | Direction to a location |

Further levels of categorization wherein a sub-request type has sub-sub-request types etc. may also be used or a single level of categorization (without any sub-request types) without departing from the subject matter of the present invention.

The categorization of requests into request and sub-request types may be periodically validated or updated as necessary.

In step 14 a request is received at a call center from a caller. The request is handled by the agent making a referral. The agent may have been educated in the request and sub-request types. The agent may make the referral by offering a world wide web address known as a universal resource locator (URL) to the caller. The web page located at that URL address contains information which resolves the caller's request. For example, the information may answer a caller's question. The information may include directions to follow, to take some action which resolves the request. The information may be a report, document, audio or video clip or any other type of information which the caller has requested. Other types of information which can be contained at a URL to resolve a request will be obvious to those knowledgeable in world wide web and URL technology.

The agent determines whether the referral was accepted by the caller and enters the acceptance into a log.

In step 16 the request received and handled in step 14 is logged according to a first access resolution criteria. Logging is performed by the agent who handled the request in step 14 by entering a code or other entry into a tracking tool. For example, the IBM Logit tracking tool may be used for logging. The agent may have been educated in the first access resolution criteria and any codes assigned to the qualifying and not qualifying situations to be described below.

The first access resolution criteria defines which situations are determined to be resolved on the first contact between the caller and the call center. For example, the following situations may be defined in the first access resolution criteria as qualifying:

1. The requested information is provided on the first contact during the call.
2. A third party is conferenced into the call to assist, but does not assume ownership.
3. No further contact is needed either by the caller or call center to resolve the issue presented by the caller.
4. Requests processed during the call and completed following the call provided no additional research or input from other groups is required.
5. A request to connect to a specific individual or department is accommodated.
6. The caller is given a specific URL which addresses the request.

Whereas the following situations may be defined in the first access resolution criteria as not qualifying.

1. Requests requiring a process hand-off even if neither a live transfer nor callback is set up.
2. Requests requiring additional research or input from other groups to complete following the call.

Other first access resolution criteria may be used depending on the type of service provided by the call center, on the desired customer satisfaction level, or for any other reason that will be obvious to those of ordinary skill in the art.

In addition to logging according to first access resolution criteria, the agent logs the request and sub-request type in step 16.

In step 18, the log is analyzed to determine first access resolution results by request and sub-request types. This analysis may be performed periodically. It may be performed by the supervisors of the call center, or by a service providing company, a contractor, the company for which the call center is providing service, or by the call center agents themselves.

A scoring system may be used in the analysis, such as the percent of calls qualifying according to the first access resolution criteria.

For those request and sub-request types having a low score, the content of the referral is enhanced in step 22. If the referral is a specific URL world wide web page, then the owner of that page may be asked to improve or enhance the content of that page to achieve a higher score for particular request or sub-request types.

Steps 12-22 may be implemented using a computer system and software whether as a single complete application or a collection of separately developed structures. The software may be provided on a recordable medium such as a CD Rom, diskette, hard drive or any other medium known in the art. Software may also be provided over a network including methods of delivery known in the art as on-demand.

In FIG. 2 there is shown a more detailed flowchart showing steps in the referral and acceptance of the referral process. In step 33 a customer or business partner (BP) makes a request to a call center. The call center follows its normal, business as usual (BAU) call handling process in step 34. The call is tracked in step 36 which may include use of a tracking tool such as the IBM Logit tool. The tool may gather tracking data automatically from the telephone system, for example, the date and time of call, and caller phone number. From tables or lookup capability the tool may also identify the caller name, location, and other data relating to the caller that was previously determined such as call history, products purchased, or other relevant data.

In steps 38, 40, and 42 the request and sub-request types and first access resolution criteria codes respectively are also entered into the tracking tool. This additional data entered in steps 38, 40, and 42 may be entered by the agent using a conventional entry device such as a computer keyboard, pointing device, speech recognition capability, telephone keyboard, or any other type of entry device known in the art. The additional data may also be entered automatically into the tracking tool through analysis of the interaction between the agent and the caller. This interaction may be over the telephone line, or through computer communications such as e-mail, instant messaging, on-line video, or voice over IP. If over the telephone line, a device for sensing telephone keypad tones (DTMF) may be used. Speech recognition technology may also be used to analyze spoken words and referrals by either the agent or the caller and enter the data in steps 38, 40, or 42.

In the case of other computer communication, the content of the communication may be automatically scanned to determine data to enter in steps 38, 40, or 42.

In step 44, a determination is made whether a web page (URL) referral was offered to the caller. If not, for example because no web content is available for this request, that situation is logged in step 48.

When a URL was offered, a determination is made in step 46 of whether the caller or customer accepted the web referral. Further determinations may also be made as shown in FIG. 2 for step 46. For example, whether the customer wanted navigational instructions, for this URL, e-mailed. If the referral was declined, the reason for the decline may be determined in step 46. For example, the customer may have already visited the referral URL site and was not able to resolve the question or issue with the content provided therein. The customer may also prefer to speak with a person. All of the determinations made in step 46 are entered into the tracking tool using entry techniques described above.

In step 50, the data entered into the tracking tool in steps 38, 40, 42, 46, and 48 is periodically gathered and analyzed. Based on the analysis, the content of the appropriate URL site may be enhanced to provide a higher possibility of a web referral being offered by the agent and a higher acceptance level of an offered web referral.

While there have been shown and described what are at present considered the preferred embodiments of the invention, it will be obvious to those skilled in the art that various changes and modification may be made therein without departing from the scope of the invention as defined by the appended claims.

What is claimed is:

1. The method of operating a call center, comprising the steps of:
   categorizing common inquiries into request and sub-request types;
   receiving a request from a caller and handling said request via a referral;
   logging said request into a log according to first access resolution criteria, and said request and sub-request types;
   periodically analyzing said log using a scoring system to determine first access resolution results by sub-request type; and
   enhancing content of said referral for those of said sub-request types having scores below a predefined value for said first access resolution results.

2. The method of claim 1, wherein said referral comprises reference to a URL.

3. The method of claim 1, further comprising identifying most frequently asked questions from callers at said call center, and categorizing said questions to form said request and sub-request types.

4. The method of claim 1, further comprising entering codes for said request and sub-request types into a tracking tool.

5. The method of claim 1, further comprising periodically analyzing said log to determine first access resolution results by request and sub-request type.

6. The method of claim 1, wherein said first access resolution criteria includes referral to a specific URL which addresses said request.

7. The method of claim 1, wherein said request is received by a call center agent employee.

8. The method of claim 7, further comprising educating said agent employee in said request and sub-request types and said first access resolution criteria.

9. The method of claim 1, further comprising determining whether said referral was accepted and entering the acceptance into said log.

10. The method of claim 1, further comprising periodically validating said request and sub-request types.

11. A computer system for operating a call center, said system comprising:
    means for categorizing common inquiries into request and sub-request types;
    means for identifying a referral for a request received at said call center;
    means for logging said request into a log according to first access resolution criteria, and said request and sub-request types;
    means for periodically analyzing said log using a scoring system to determine first access resolution results by sub-request type; and
    means for enhancing content of said referral for those of said sub-request types having scores below a predefined value for said first access resolution results.

12. The system of claim 11, wherein said referral comprises reference to a URL.

13. The system of claim 11, further comprising means for identifying most frequently asked questions form callers at said call center, and categorizing said questions to form said request and sub-request types.

14. The system of claim 11, wherein said first access resolution criteria includes referral to a specific URL which addresses said request.

15. A computer program product embodied in a computer readable storage medium for operating a system comprising a network I/O, a CPU, and one or more database, for implementing a method of operating a call center, said computer program product comprising:
    first program instruction means for categorizing common inquiries into request and sub-request types;
    second program instruction means for receiving a request from a caller and handling said request via a referral;
    third program instruction means for logging said request into a log according to first access resolution criteria, and said request and sub-request types;
    forth program instruction means for periodically analyzing said log using a scoring system to determine first access resolution results by sub-request types; and
    fifth program instruction means for enhancing content of said referral for those of said sub-request types having scores below a predefined value for said first access resolution results.

16. The computer program product of claim 15, wherein said referral comprises reference to a URL.

17. The computer program product of claim 15, further comprising program instruction means for identifying most frequently asked questions from callers at said call center, and categorizing said questions to form said request and sub-request types.

18. The computer program product of claim 15, wherein said first access resolution criteria includes referral to a specific URL which addresses said request.

19. A method of providing call center operation capability to a client, comprising the steps of:
    delivering to said client a means for categorizing common inquiries into request and sub-request types;
    delivering to said client a means for receiving a request from a caller and handling said request via a referral;
    delivering to said client a means for logging said request into a log according to first access resolution criteria, and said request and sub-request types;
    delivering to said client a means for periodically analyzing said log using a scoring system to determine first access resolution results by sub-request type; and
    delivering to said client a means for enhancing content of said referral for those of said sub-request types having scores below a predefined value for said first access resolution results.

20. The method of claim 19, wherein said referral comprises reference to a URL.

21. The method of claim 19, further comprising delivering to said client a means for identifying most frequently asked questions from callers at said call center, and categorizing said questions to form said request and sub-request types.

22. The method of claim 19, wherein said first access resolution criteria includes referral to a specific URL which addresses said request.

* * * * *

UNITED STATES PATENT AND TRADEMARK OFFICE
CERTIFICATE OF CORRECTION

PATENT NO. : 7,616,756 B2
APPLICATION NO. : 10/739563
DATED : November 10, 2009
INVENTOR(S) : Blackwood et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1726 days.

Signed and Sealed this

Nineteenth Day of October, 2010

David J. Kappos
*Director of the United States Patent and Trademark Office*